(12) United States Patent
Kasher et al.

(10) Patent No.: US 7,890,061 B2
(45) Date of Patent: Feb. 15, 2011

(54) SELECTIVE 40 MHZ OPERATION IN 2.4 GHZ BAND

(75) Inventors: Assaf Kasher, Haifa (IL); Gal Basson, Haifa (IL); Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 825 days.

(21) Appl. No.: 11/768,330

(22) Filed: Jun. 26, 2007

(65) Prior Publication Data

US 2007/0298810 A1    Dec. 27, 2007

Related U.S. Application Data

(60) Provisional application No. 60/817,174, filed on Jun. 27, 2006.

(51) Int. Cl.
*H04B 17/00* (2006.01)
(52) U.S. Cl. ............... 455/67.11; 455/67.13; 455/63.1; 455/188.1; 455/447; 455/427; 455/13.1; 455/76; 455/112; 455/452.1; 375/150; 375/350; 375/260; 375/242; 375/148; 370/474; 370/536; 370/431; 370/254; 370/465; 704/229
(58) Field of Classification Search ............. 455/452.1, 455/112, 76, 13.1, 427, 447, 188.1, 63.1, 455/67.11, 67.13; 375/150, 350, 260, 242, 375/148; 370/474, 536, 431, 254, 465; 704/229
See application file for complete search history.

(56) References Cited

U.S. PATENT DOCUMENTS

| 4,811,361 | A  | * | 3/1989  | Bacou et al. ............... 375/242 |
| 6,914,941 | B1 | * | 7/2005  | Moshe et al. .............. 375/260 |
| 7,200,360 | B1 | * | 4/2007  | Chang et al. .............. 455/13.1 |
| 7,206,722 | B2 | * | 4/2007  | Pickerd et al. ............. 702/190 |
| 7,573,964 | B2 | * | 8/2009  | Wang et al. ................ 375/350 |
| 2005/0090208 | A1 | * | 4/2005  | Liao ......................... 455/112 |
| 2006/0133457 | A1 | * | 6/2006  | Wang et al. ................ 375/148 |
| 2006/0146869 | A1 | * | 7/2006  | Zhang et al. .............. 370/465 |
| 2006/0224365 | A1 | * | 10/2006 | Pickerd et al. ............. 702/190 |
| 2006/0286935 | A1 | * | 12/2006 | Utsunomiya et al. ....... 455/63.1 |
| 2007/0041322 | A1 | * | 2/2007  | Choi et al. ................. 370/235 |
| 2007/0083363 | A1 | * | 4/2007  | Kim et al. .................. 704/229 |
| 2007/0298810 | A1 | * | 12/2007 | Kasher et al. ............ 455/452.1 |

* cited by examiner

*Primary Examiner*—Matthew D Anderson
*Assistant Examiner*—April G Gonzales
(74) *Attorney, Agent, or Firm*—Blakely, Sokoloff, Taylor & Zafman LLP

(57) ABSTRACT

Methods and apparatuses enable selective operation in an extended bandwidth channel of a wireless communication band. For example, a client station can be selectively authorized to operate on a 40 MHz channel in a 2.4 GHz band. The client station or an access point or both can determine whether interference exists in the wireless communication band. If potential interference exists, the client station may operate on a non-extended bandwidth channel. If potential interference does not exist, the client station may operate on an extended bandwidth channel. Operation between the two channels can be dynamic based on continued monitoring of the wireless communication band for potential interference.

13 Claims, 3 Drawing Sheets

SELECTIVE 40 MHZ OPERATION IN 2.4 GHZ BAND

RELATED APPLICATION

This U.S. patent application claims the benefit of priority of U.S. Provisional Application 60/817,174 filed Jun. 27, 2006.

FIELD

Embodiments of the invention relate to wireless communications, and more particularly to selectively providing 40 MHz channels in a 2.4 GHz band.

BACKGROUND

Certain wireless standards provide for operation in the 2.4 GHz band. Legacy channels for operation in the 2.4 GHz band provide 20 MHz of bandwidth. Newer systems may support an extended bandwidth channel (which may also be referred to as an "extension channel") to allow greater throughput. The extended bandwidth channel is traditionally two 20 MHz channels to provide 40 MHz of bandwidth. Operating in a 40 MHz channel in 2.4 GHz provides several problems with respect to channel spacing. For example, channel availability may be adversely affected. A single 40 MHz channel may leave space for operation of only one more 20 MHz channel in the band. In some scenarios (e.g., most out-of-the-box system configurations) may not even allow for operation a 20 MHz channel and a 40 MHz channel in the same band.

Besides the problems associated with channel availability, coexistence mechanisms between legacy 802.11b/g on the extension channel and the 40 MHz base station system (BSS) are problematic. There are currently no other frequencies a BSS can move to if it encounters interference. Channel spacing issues, default settings, and protection mechanism are inadequate. The 2.4 GHz spectrum is congested with hundreds of millions of wireless local area networks (WLANs) in addition to countless Bluetooth devices (BLUETOOTH of the Bluetooth Special Interest Group of Bellevue, Wash., standardized in, e.g., IEEE 802.15.1-2005, IEEE 802.15.2-2003, IEEE 802.15.3-2003), cordless phones, baby monitors, microwave ovens, etc., and suffers a general lack of adequate coexistence mechanisms. The result is poor system performance at best, and can frequently result in no system throughput in adjacent systems.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
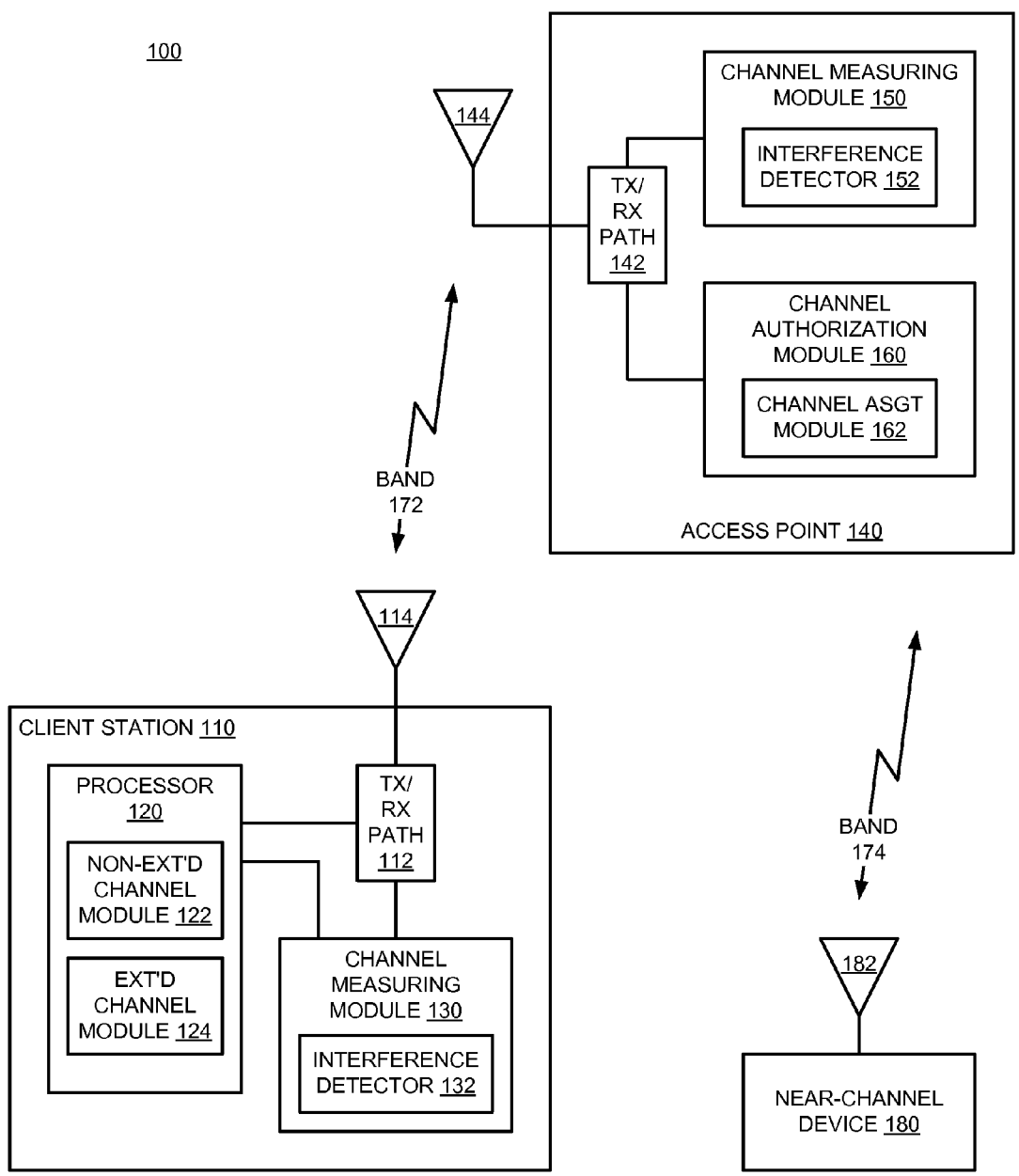
FIG. 1 is a block diagram of an embodiment of a wireless communication system having a client device communicating with an access point on a particular frequency channel, and another client device operating on a particular frequency channel.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Methods and apparatuses enable selective operation of a client station and an access point or base station in an extended bandwidth channel of a wireless communication band. The client station or the access point or both can determine whether interference exists in the wireless communication band. If potential interference exists, the client station may operate on a non-extended bandwidth channel. If potential interference does not exist, the client station may operate on an extended bandwidth channel. Operation between the two channels can be dynamic based on continued monitoring of the wireless communication band for potential interference. Thus, interference can be measured prior to allocation of the extended bandwidth channel, and/or evaluated for a client station operating on an extended bandwidth channel. More details are provided below.

The family of 802.11 standards (collectively "WiFi") as provided by the Institute of Electrical and Electronics Engineers (IEEE), such as 802.11b—Oct. 1999, 802.11g—Jun. 2003, and 802.11n (draft D2.02 in discussion as of May 2007), may involve operation/transmission in the 2.4 GHz band. The traditional practical usable bandwidth in the 2.4 GHz band is only 70 MHz wide, ranging from 2402 MHz to 2472 MHz (assuming orthogonal frequency division multiplexing (OFDM) use in the United States). Legacy channels for operation in the 2.4 GHz band provide 20 MHz of bandwidth. Newer standards or proposed standards (e.g., 802.11n) provide for an extended bandwidth channel, which allows 40 MHz of bandwidth (generally two 20 MHz channels). Such systems generally define 5 MHz channel spacing, and any channel can be the center of a 20 MHz or 40 MHz channel. Default access point (AP) settings are 1, 11, 6, 3, and 5 for most 802.11g AP vendors. The standards would need to be extended to allow for control information for the extended channel, which traditionally is not possible. Additionally, an extension would be required to determine what type of channel spacing is to be used in the system.

Unlike suggestions that have been made to disallow extended channel operation in 2.4 GHz, as described herein, extended channel operation can be enabled when selectively employed. In one embodiment, a system is provided that allows operation on 40 MHz channels in the 2.4 GHz band when there are no devices in or near the extension channel, and disallows operation on 40 MHz channels if there is interference. As used herein, "in" the extension channel refers to a device operating 20 MHz off the control channel 20 MHz. As used herein, "near" the extension channel refers to a device operating 20/25/30 MHz off the control channel. Thus, the channel space can be measured (by either the access point (AP) or the client station (STA)) to determine if interference exists on an extended bandwidth channel.

As used herein, interference on the extended bandwidth channel refers to a device operating in or near the extension channel. If interference is detected, a STA is prevented from operating on a 40 MHz channel. If no interference is detected, the STA can be permitted to operate on a 40 MHz channel. Additionally, the detection of interference and restriction to a non-extended bandwidth (e.g., 20 MHz) channel can occur dynamically within a system. Thus, a STA can be allowed to transmit on a 40 MHz channel, and then interference can be detected on the active 40 MHz channel. If interference is detected, the STA can be prevented from continuing to transmit on the 40 MHz channel, and instead receive a 20 MHz channel assignment.

In an implementation where channel measurement is performed, the channel measurement can be via the AP or via the STA. In one embodiment, a central approach is implemented where extension channel measurement is performed only at the AP. If the AP senses transmission in the extension channel as above, it switches the system to 20 MHz.

In another embodiment, a distributed approach is implemented where a STA (not necessarily an AP) measures for extension channel interference. If interference is detected, the STA can stop transmitting on a 40 MHz channel and request the AP to stop transmitting to it using the 40 MHz channel. In one embodiment, if the AP senses transmission in the extension channel as above, it switches the whole system to 20 MHz.

Thus, channel measurement for interference can occur prior to assignment of the extension channel to a STA, and the STA restricted to use of a 20 MHz channel if interference is detected. The STA can perform the measurement prior to requesting the channel and/or the AP can measure the extension channel prior to providing the authorization to use the channel. If the AP measures the channel, it may pass an indication to the STA that the channel has interference, and prevent access to the extension channel. Also, or alternatively, a device operating on the extension channel can be dynamically removed from operation on the extension channel. In one embodiment, the channel can be measured for interference while the device is transmitting in the extension channel. In another embodiment, operation on a 40 MHz channel can be switched by the system to 20 MHz operation if it is determined when a STA is transmitting in the extension channel that interference passes a threshold level. For example, the threshold may be a 20% duty cycle (time) of 10 seconds. Alternatively, the 40 MHz operation can automatically switch to 20 MHz operation after 10 seconds of operation (and potentially switch back).

In one embodiment, operation in 20 MHz could be switched back to 40 MHz operation. Switching operation back to 40 MHz can occur when a trigger is detected. The trigger can be a trigger indicating that transmission on the extension channel should recommence, or a trigger to re-test the extension channel for interference to determine if the channel is available. The trigger can be at the expiration of a time period (e.g., 300 seconds after switching to 20 MHz), and/or at the occurrence of a trigger event. The event can be the reaching of a threshold number of packets transmitted at 20 MHz, the AP reaching a threshold traffic load, etc. Thus, operation on the extension channel can be dynamically switched to and from a non-extended bandwidth channel.

FIG. 1 is a block diagram of an embodiment of a wireless communication system having a client device communicating with an access point on a particular frequency channel, and another client device operating on a particular frequency channel. System 100 represents a wireless communication system as described herein. System 100 includes client station 110, which represents any of a number of client devices that might operate in a wireless communication band having extended and non-extended channels, such as the 2.4 GHz band. Examples of such devices are listed above.

Client station 110 includes transmit/receive (TX/RX) path 112, and antenna 114, which represent wireless communication elements of client station 110. In one embodiment, they can collectively be considered a transceiver. TX/RX path 112 represents filters, drivers, timing and frequency control elements, etc., which provide the ability of client station 110 to drive antenna 114 and receive signals impinging on antenna 114.

Client station 110 includes processor 120, which represents control logic, signal processor(s), or other component capable of controlling one or more elements of TX/RX path 112, or directing how signal transmission will be handled. As illustrated, processor 120 may include the functionality for operation in an extended channel or a non-extended channel, although the functionality of processor 120 need not be limited in this respect. Non-extended channel module 122 represents hardware and/or software through which client station 110 can operate on a non-extended bandwidth channel, or a standard channel for the communication band (e.g., a 20 MHz channel in 2.4 GHz). Extended channel module 124 represents hardware and/or software through which client station 110 can operate on an extended bandwidth channel (e.g., a 40 MHz channel in 2.4 GHz). Modules 122 and 124 may set configuration settings (e.g., control parameters within a microprocessor or other digitally controlled integrated circuit (IC), calibrate hardware components (e.g., clocks or crystals, amplifiers), etc.). Modules 122 and 124 may also represent processing elements with which client station 110 sends communication to access point 140 and/or receives communication from access point 140 regarding which channel will be used.

Processor 120 provides the ability to client station 110 to dynamically switch between operation in an extended channel and a non-extended channel. Thus, non-extended channel module 122 and extended channel module 124 represent components that allow for in-operation changes to TX/RX path 112. Note that certain components of TX/RX path 112 must be dynamically configurable rather than having a static configuration to allow such changing of operation.

In one embodiment, client station 110 includes channel measuring module 130, which represents components that measure a channel or a portion of spectrum to determine whether other communication signals are present within the spectrum. Channel measuring module 130 can measure the entire range of spectrum relevant to the communication channels on which client station 110 may operate. Channel measuring module 130 detects signals in the transmission medium. In one embodiment, interference detector 132 determines whether the detected signals should be considered interference. Specifically as described herein, interference detector 132 will be described for purposes of detecting interference related to whether client station 110 will operate on an extended or non-extended bandwidth channel. However, interference detector 132 may perform other functions.

In one embodiment, a certain amount of interfering signal is tolerated for client station 110 to operate on an extended bandwidth channel. For example, near-channel devices that occupy less than a threshold of a duty cycle time may generate tolerable interference levels, and may tolerate the interference caused by the 40 MHz Access point, whereas duty cycle times over the threshold may represent interference levels high enough that client station 110 will not operate on an extended bandwidth channel. In one embodiment, the threshold is zero, meaning that any interference may cause client station 110 to operate in a non-extended bandwidth channel rather than an extended bandwidth channel. Interference detector 132 may use other metrics, such as strength of the (potentially) interfering signal.

Channel measuring module 130 may operate periodically (e.g., scheduled) and/or in an asynchronous manner (e.g., in conjunction with events or triggers, or in response to requests). Periodic operation may occur in response to a timer (which may be part of channel measuring module 130, part of processor 120, or a different component not shown). Asynchronous operation may occur in response to or in conjunction with requests sent by processor 120 for an extended bandwidth channel. The measurement may occur prior to making the request, or after the request is generated. Asynchronous operation may also occur in response to a request by processor 120 to perform a measurement (e.g., either prior to a channel request, or during operation of client station 110 on an extended bandwidth channel). Channel measuring module 130 may also perform a measurement in response to a request received from access point 140.

Access point 140 represents a device that is coupled to a (typically wired) backend network, through which client station 110 has access to data or other devices. Access point 140 includes TX/RX path 142 and antenna 144, which may be similar to TX/RX path 112 and antenna 114 of client station 110. In short, TX/RX path 142 and antenna 144 provide access point 140 the ability to send and receive wireless signals on the wireless communication band of system 100. In one embodiment, access point 140 may be considered to control "the system," and reference above to the system performing certain functions can be understood to refer to access point 140 performing certain functions.

In one embodiment, access point 140 includes channel measuring module 150. Note that one or both of access point 140 and client station 110 may include channel measuring modules that are used for channel measurement in connection with determining whether client station 110 should operate on an extended or non-extended bandwidth channel. If both devices include channel measuring modules, one or both may be used in the system for channel measurement in connection with determining whether client station 110 should operate on an extended or non-extended bandwidth channel.

The operation of channel measuring module 150 may be similar to that of channel measuring module 130 of client station 110. Namely, channel measuring module 150 may measure the whole or part of the spectrum of system 100 and determine whether potentially interfering signals exist or are present. Similar to interference detector 132, in one embodiment, channel measuring module 150 includes interference detector 152, which may determine whether detected signals should be considered interference. Interference detector 152 may monitor for a threshold amount of interference, or for any interference at all (or for potential interference, such as an adjacent channel that has no band gap with the extension channel). Channel measuring module 150 may likewise operate periodically (e.g., scheduled), or asynchronously (e.g., events or triggers, requests). Events and triggers may include time periods, a threshold number of data packets, an amount of traffic handled by access point 140, etc. Any of such event or triggers may operate as re-test triggers that could indicate a measurement to determine whether to change client station 110 from operation in a non-extended bandwidth channel back to operation in an extended bandwidth channel.

Channel measuring module 150 can take a measurement to determine whether interference exists before allocation of an extended bandwidth channel, or can determine during operation of a client station whether interference exists and whether the client station can/should be reassigned. In one embodiment, access point 140 requests client station 110 to perform the measurements.

Access point 140 also includes channel authorization module 160, which includes channel assignment module 162. Channel authorization module 160 represents hardware and/or software that enable access point 140 to determine what channel assignment to authorize for client station 110. Channel authorization module 160 may only authorize communication on a non-extended bandwidth channel under certain (potential) interference conditions. Channel assignment module 162 represents a functional module that enables access point 140 to assign either a standard channel or an extension channel, and indicates the parameters of the channel (e.g., how far off the control channel, or what the center frequency is). Channel assignment module 162 is responsive to the determination of channel measuring module 150, and the transmission control decisions of channel authorization module 160.

Communication between client station 110 and access point 140 is represented by band 172, which is a communication link operating in a particular frequency band. As discussed, band 172 is either a non-extended bandwidth channel or an extended bandwidth channel, which is selectively determined based on interference with an extended bandwidth channel.

Figure 2:
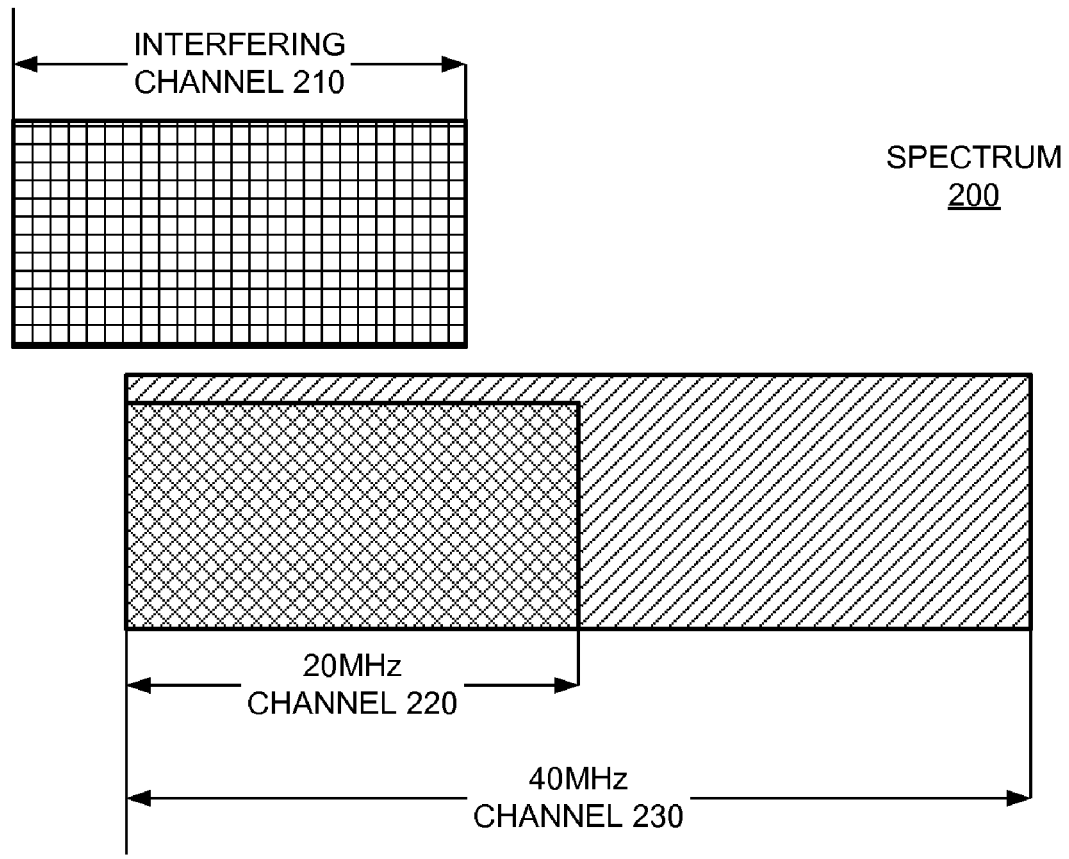
FIG. 2 is a block diagram of an embodiment of a wireless communication band having particular channel assignments.

System 100 is illustrates with near-channel device 180, which represents another of the types of devices that operate in the wireless communication spectrum of system 100 (e.g., 2.4 GHz). Near-channel device 180 is referred to as a near-channel device because band 174 operates close to or overlapping with the spectrum that would be allocated for an extension channel for client station 110. FIG. 2 below provides more details with respect to the spectrum use within system 100. Note that near-channel device 180 may or may not be in communication with the access point 140, which is in communication with client station 110. That is, near-channel device 180 could potentially interfere with extension channel use by client station 110, whether near-channel device 180 communicates with access point 140 or with some other access point (not shown).

Various components described herein may be a means for performing the functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

FIG. 2 is a block diagram of an embodiment of a wireless communication band having particular channel assignments. Spectrum 200 represents the 2.4 GHz band as is commonly used for "WiFi" devices. The drawing is not necessarily to be understood as being to scale. The 2.4 GHz band includes 70 MHz of bandwidth, from 2.402 GHz to 2.472 GHz. In one embodiment, an interfering device (for example, near channel device 180 of FIG. 1) operates on interfering channel (a 20 MHz band) 210 near the bottom end of the spectrum. An extended channel device (for example, client station 110 of FIG. 1) operates in either 40 MHz band (or channel) 230 or 20 MHz band (or channel) 220, depending on whether interference is present.

Assume there is a band gap sufficiently wide to enable the extended channel device to operate simultaneously in 40 MHz (230) while the interfering device (which would not really be considered an "interfering" device in this scenario) operates in the 20 MHz channel (210). Thus, interference detection by the extended channel device and/or its associated access point may not detect interference that would prevent the extended channel device from operating in 40 MHz. Thus, the extended channel device would be authorized to operate in 40 MHz channel 230. However, assume that the gap between interfering channel 210 and the spectrum to be used by the extended channel device is narrow enough, or overlaps with 40 MHz channel 230 sufficiently to be detected as interfering. Detection of the interference can trigger the extended channel device to operate on 20 MHz channel 220 for a period of time or until interference is not detected. After the period of time, or a change of system conditions (e.g., a decrease in load, or some other change), a re-test of the spectrum may be triggered to determine if interference exists. If interference is not detected, the extended channel device can be dynamically changed back to operate on 40 MHz channel 230. Note that in one embodiment, switching from operating in 40 MHz channel 230 (which includes two 20 MHz channels) to operating in 20 MHz channel 220 involves selecting one of the 20 MHz channels. In one embodiment, switching from operating in a 40 MHz channel to a 20 MHz channel involves switching to the lower of the two 20 MHz channels.

Figure 3:
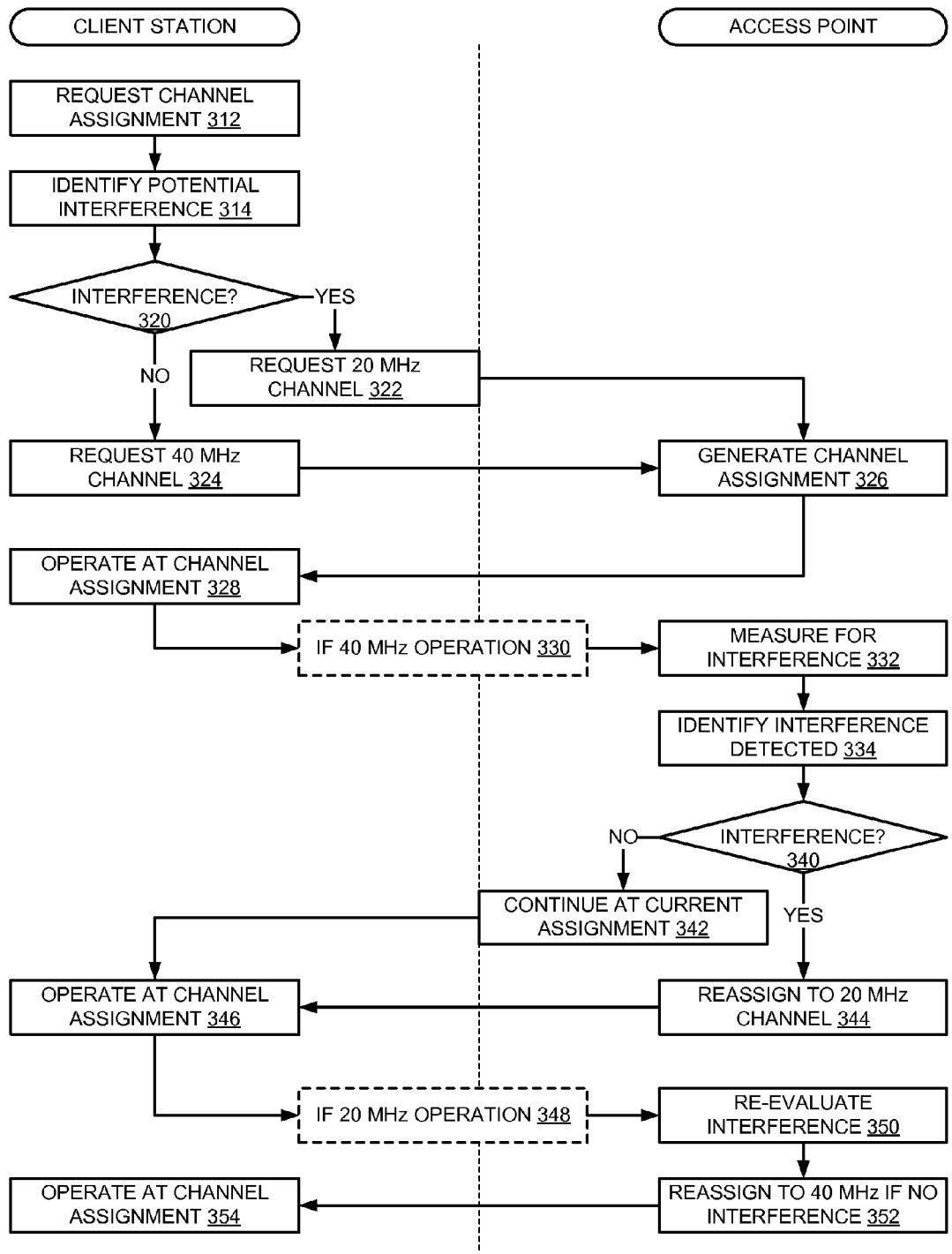
FIG. 3 is a flow diagram of an embodiment of a process for selectively allowing a client station to operate on an extended bandwidth channel.

FIG. 3 is a flow diagram of an embodiment of a process for selectively allowing a client station to operate on an extended bandwidth channel. A flow diagram as illustrated herein provides examples of sequences of various process actions. Although shown in a particular sequence or order, unless otherwise specified, the order of the actions can be modified. Thus, the illustrated implementations should be understood only as examples, and the process can be performed in a different order, and some actions may be performed in parallel. Additionally, one or more actions can be omitted in various embodiments of the invention; thus, not all actions are required in every implementation. Other process flows are possible.

The client station represents a client station according to any embodiment described herein. The access point represents an access point according to any embodiment described herein. The client station requests or generates a request for a channel assignment 312. The client station may initially determine to request a 40 MHz channel. In one embodiment, the client station should perform an interference check in conjunction with generating a request for an extended (40 MHz) channel. Thus, the client station may identify potential interference, 314. If interference is detected, 320, the client station may request a 20 MHz channel instead of a 40 MHz channel, 322. If interference is not detected, 320, the client station continues with the request for the 40 MHz channel, 324.

In response to the request for the communication channel, the access point generates a channel assignment, 326. Those of skill in the art will be familiar with the process of an access point determining which band of spectrum to assign for a particular channel assignment. The process may also be different for 40 MHz channels versus 20 MHz channels. The access point indicates the channel assignment to the client station, which can then operate at the channel assignment, 328.

If the client station is operating at a 40 MHz channel assignment, 330, the following sequence may occur. If the client station is operating at a 20 MHz channel assignment, the following sequence could occur in a modified manner. In one embodiment, the access point measures for interference, 332. The access point identifies any interference detected, 334. Note that the measuring for interference and the detecting interference at 314 and 334 could be performed by either or both devices. Thus, the fact that 314 illustrates the client station identifying interference, such an operation could be performed by the access point. Similarly, the client station could measure for interference (modifying 332) and identifying interference (modifying 334). Note also that the measuring for interference and the identifying interference could be performed if the client station is operating at 20 MHz, but could be performed for the intent of determining whether to change the client station to 40 MHz operation, rather than determining whether 40 MHz operation can continue.

If the access point does not identify interference, 340, the access point determines the client station should continue at the current channel assignment, 342. If the current assignment is appropriate, the access point may simply continue to operate at the assignment rather than sending a message indicating the current assignment should continue. However, such a message could be sent. If the access point detects interference, 340, the access point reassigns the client station to operation in a 20 MHz channel, 344, and indicates the assignment change to the client station. Whichever assignment is determined for the client station, the client station operates at the channel assignment, 346.

In one embodiment, changing to 20 MHz operation will trigger a re-test for a future determination of whether to continue at 20 MHz or to return to 40 MHz operation. Thus, if the client station is operating at 20 MHz, 348, the access point may enable the system to re-evaluate interference, 350. Note that as with the above discussion, the client station could be the device that re-evaluates the interference. The re-evaluation could occur as the result of a certain amount of time passing, and/or could be monitored periodically. A system event may also trigger a re-evaluation of the interference (e.g., a station dropping out of the system). A similar interference determination is made as above, and the client station is reassigned to a 40 MHz channel is no interference is detected, 352. And, operation can continue in the 20 MHz channel if interference is detected. The client station then operates at the channel assignment, 354.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   determining to assign a client station an extended bandwidth channel in a wireless communication band of a wireless communication system;
   receiving an indication from the client station that the client station detected interference in the extended bandwidth channel of the wireless communication band;
   restricting operation of the client station to a non-extended bandwidth channel in response to the indication from the client station that interference exists on the extended bandwidth channel, wherein restricting operation of the client station to the non-extended bandwidth channel includes:
      waiting for a re-test trigger that indicates the extended bandwidth channel should be re-measured to determine if interference exists on the extended bandwidth channel;
      determining whether interference exists on the extended bandwidth channel in response to the re-test trigger; and
      switching from operation on the non-extended bandwidth channel to operation on the extended bandwidth channel if it is determined that interference does not exist on the extended bandwidth channel; and
   authorizing operation of the client station on the extended bandwidth channel when interference does not exist on the extended bandwidth channel.

2. The method of claim 1, wherein the wireless communication band comprises the 2.402 GHz to 2.472 GHz radio wave spectrum, and wherein the extended bandwidth channel comprises a 40 MHz channel and the non-extended bandwidth channel comprises a 20 MHz channel.

3. The method of claim 1, wherein receiving the indication that interference exists further comprises:
   receiving the indication in response to the client station measuring the wireless communication band for interference from another client station operating in the wireless communication band.

4. The method of claim 3, wherein measuring the wireless communication band for interference comprises:
   determining that transmissions from the other client station exceed a threshold duty cycle time.

5. The method of claim 4, wherein determining that the transmissions exceed the threshold duty cycle time comprises:
   determining that the transmissions exceed a 20% duty cycle time.

6. The method of claim 1, wherein waiting for the re-test trigger comprises:
   waiting for one or more of a period of time or a transmission of a number of data packets.

7. The method of claim 1, wherein waiting for the re-test trigger further comprises:
   determining a load on an access point; and
   triggering a re-test when the load reaches a threshold value.

8. An article of manufacture comprising a non-transmission machine-readable storage medium having content stored thereon to provide instructions to cause a machine to perform operations including:
   determining to assign a client station an extended bandwidth channel in a wireless communication band of a wireless communication system;
   receiving an indication from the client station that the client station detected interference in the extended bandwidth channel of the wireless communication band;
   restricting operation of the client station to a non-extended bandwidth channel in response to the indication from the client station that interference exists on the extended bandwidth channel, wherein restricting operation of the client station to the non-extended bandwidth channel includes:
      waiting for a re-test trigger that indicates the extended bandwidth channel should be re-measured to determine if interference exists on the extended bandwidth channel;
      determining whether interference exists on the extended bandwidth channel in response to the re-test trigger; and
      switching from operation on the non-extended bandwidth channel to operation on the extended bandwidth channel if it is determined that interference that interference does not exist on the extended bandwidth channel; and
   authorizing operating of the client station on the extended bandwidth channel when interference does not exist on the extended bandwidth channel.

9. The article of manufacture of claim 8, wherein the content to provide instructions for changing the client station to operating in the non-extended bandwidth in response to detecting interference comprises content to provide instructions for
   changing the client station to operating in the non-extended bandwidth in response to detecting that transmissions from another client station operating in the wireless communication band exceeds a threshold duty cycle time.

10. The article of manufacture of claim 8, further comprising content to provide instructions for
    changing the client station back from operating in the non-extended bandwidth channel to operating in the extended bandwidth channel in response to detecting a reduction in the interference.

11. A wireless client station device comprising:
    a transceiver to transmit and receive wireless signals;
    a channel measuring module coupled to the transceiver to determine whether interference exists in a wireless communication band of a wireless communication system that operates in the 2.4 GHz band; and
    a communication processor coupled to the transceiver and the channel measuring module to generate a request for a channel of a wireless communication band of a wireless communication system from an access point, indicate interference to the access point in response to detecting interference in the wireless communication band, and operate on a non-extended bandwidth channel if interference is detected in the wireless communication band and operate on an extended bandwidth channel if interference is not detected in the wireless communication band, wherein to operate in the non-extended bandwidth channel if interference is not detected further includes the client station to operate in the non-extended bandwidth in response to detecting that transmissions from another client station operating in the wireless communication band exceeds a threshold duty cycle time, and to change back from operating in the non-extended bandwidth channel to operating in the extended bandwidth channel in response to detecting a reduction in the interference.

12. The wireless device of claim 11, wherein the channel measuring module determines whether interference exists in the wireless communication band prior to the communication processor generating the request for the channel.

13. The wireless device of claim 11, wherein the channel measuring module determines whether interference exists in the wireless communication band while the communication processor operates on the extended bandwidth channel.

* * * * *